US008622486B2

(12) United States Patent
Tandler et al.

(10) Patent No.: US 8,622,486 B2
(45) Date of Patent: Jan. 7, 2014

(54) HYDRAULIC UNIT FOR REGULATING THE BRAKE PRESSURE IN A VEHICLE BRAKE SYSTEM

(75) Inventors: Juergen Tandler, Fuessen (DE); Andeas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 684 days.

(21) Appl. No.: 12/667,813

(22) PCT Filed: Jul. 1, 2008

(86) PCT No.: PCT/EP2008/058449
§ 371 (c)(1),
(2), (4) Date: May 3, 2010

(87) PCT Pub. No.: WO2009/004006
PCT Pub. Date: Jan. 8, 2009

(65) Prior Publication Data
US 2010/0207446 A1    Aug. 19, 2010

(30) Foreign Application Priority Data

Jul. 5, 2007    (DE) .......................... 10 2007 031 308

(51) Int. Cl.
*B60T 13/16*    (2006.01)
(52) U.S. Cl.
USPC ..... 303/10; 303/119.2; 303/119.3; 303/116.4
(58) Field of Classification Search
USPC ........................... 303/119.2, 119.3, 116.4, 10
See application file for complete search history.

(56) References Cited

U.S. PATENT DOCUMENTS

| | | | |
|---|---|---|---|
| 6,234,199 B1 | 5/2001 | Nohira | |
| 6,398,315 B1 * | 6/2002 | Dinkel et al. | 303/113.1 |
| 7,753,456 B2 * | 7/2010 | Iyatani | 303/119.3 |
| 2002/0135227 A1 * | 9/2002 | Sampson et al. | 303/119.3 |
| 2004/0090115 A1 * | 5/2004 | Inoue et al. | 303/119.3 |
| 2004/0160120 A1 * | 8/2004 | Weh et al. | 303/119.3 |
| 2005/0082910 A1 | 4/2005 | Otto et al. | |
| 2006/0220768 A1 * | 10/2006 | Iyatani | 335/78 |
| 2007/0018498 A1 * | 1/2007 | Nakazawa | 303/119.3 |
| 2007/0096553 A1 * | 5/2007 | May et al. | 303/119.3 |
| 2007/0228820 A1 * | 10/2007 | Nakamura | 303/119.3 |

FOREIGN PATENT DOCUMENTS

| | | |
|---|---|---|
| DE | 19959670 A1 | 6/2000 |
| DE | 10237163 A1 | 2/2004 |
| WO | 03064229 A1 | 8/2003 |

* cited by examiner

Primary Examiner — Robert A Siconolfi
Assistant Examiner — James Hsiao
(74) Attorney, Agent, or Firm — Maginot, Moore & Beck

(57) ABSTRACT

The invention is based on a hydraulic unit for regulating the brake pressure in a vehicle brake system. Hydraulic units of such a type are the core component of an anti-lock vehicle brake system, of a drive slip vehicle brake system or of a vehicle brake system which regulates driving stability. The invention proposes a particularly advantageous arrangement of the required recesses in a housing block of a hydraulic unit. On account of the arrangement, the housing block can be reduced in terms of its dimensions, and can be produced with a lower weight and more simply in terms of production. For this purpose, according to the invention, the pressure fluid connection from one of the ports of the master brake cylinder to the suction side of one of the pump elements extends through the valve receptacle of the switching valve.

12 Claims, 3 Drawing Sheets

HYDRAULIC UNIT FOR REGULATING THE BRAKE PRESSURE IN A VEHICLE BRAKE SYSTEM

CROSS-REFERENCE TO RELATED APPLICATION

This application is a 35 USC 371 application of PCT/EP 2008/058449 filed on Jul. 1, 2008.

BACKGROUND OF THE INVENTION

1. Field of the Invention

The invention is based on a hydraulic regulating the brake pressure in a vehicle brake system.

2. Description of the Prior Art

For safety reasons, recent models of motor vehicles are as a rule equipped with a vehicle brake system that has anti-lock, traction control, and/or vehicle control programs. The key element of such vehicle brake systems is a hydraulic unit disposed in the vehicle. The hydraulic unit is able to regulate the brake pressure at one or more wheels of the vehicle automatically as needed, with the aid of an electronic control unit, and thereby to stabilize the vehicle. The control unit to that end evaluates signals of sensors in the vehicle and triggers hydraulic components disposed on the hydraulic unit electronically accordingly.

In the prior art, a vehicle brake system with driving stability control is well known. See the brochure published by Robert Bosch GmbH, entitled "*Fahrstabilisierungssysteme*" [Driving Stability Systems], page 90, FIG. 3, which appeared in the "*Gelbe Reihe, Ausgabe* 2004" ["Yellow Series, 2004 Edition"], ISBN 3-7782-2026-8. To aid in understanding the invention, the circuit diagram disclosed there is appended as FIG. 1 and will now be described briefly:

The known vehicle brake system includes a driver-actuated master cylinder 10 for generating a brake force by muscle power. Connected to the master cylinder 10 are two separate brake circuits 12, 14, each with two wheel brakes 16, 18; 20, 22. For individual-wheel regulation of the brake pressure, there is a hydraulic unit 24. It is connected between the master cylinder 10 and the wheel brakes 16-22 and has different hydraulic components. Each wheel brake is preceded by a respective inlet valve 26 and followed by a respective outlet valve 28. The inlet valves 26 control a brake pressure buildup and the outlet valves 28 control a brake pressure reduction at the associated wheel brakes 16-22. One pump 32 per brake circuit, which can be driven by an electric motor 30, is capable of aspirating brake fluid out of the associated wheel brake 16-22 via one of the outlet valves 28 for brake fluid reduction and pumping it into the brake circuit 12, 14. To enable making a fast brake pressure buildup, a low-pressure reservoir 34 is connected between the outlet valves 28 and the pump 32 of one brake circuit 12, 14. Between the pump 32 and the low-pressure reservoir 34, there is a check valve 36 that closes in the direction from the pump 32 to one of the wheel brakes 16-22. This valve prevents the underpressure on the intake side of the pump 32 from being propagated into one of the wheel brakes 16-22.

Each brake circuit 12, 14 furthermore has a high-pressure on-off valve 38 and a reversing valve 40. The high-pressure on-off valve 38 makes it possible for the pump 32, as needed, to aspirate necessary additional brake fluid directly from the master cylinder 10. The reversing valve 40, in the event of its actuation, can block a pressure fluid connection from the wheel brakes 16, 18; 20, 22 of a brake circuit 12, 14 with the master cylinder 10. This is necessary in case brake pressure at one of the wheel brakes 16-22 is supposed to be automatically built up regardless of what the driver is asking for. This situation occurs during a traction control operation and/or driving stability control operation.

Moreover, check valves 42 are provided for controlling bypass conduits around the inlet valves 26 and the reversing valves 40. Thus a reduction of brake pressure is made possible even if the inlet valves 26 are closed, and a buildup of brake pressure is made possible if the reversing valves 40 are closed, or in other words during a traction control or driving stability control operation that is taking place. Line connections are also embodied on the hydraulic unit 24 in order to put the aforementioned components 26-42 into hydraulic contact with one another. These line connections are represented in the schematic illustration by straight connecting lines.

The invention to be described below is based on embodying this known hydraulic circuit diagram in an especially space-saving way that is easy to achieve in the production of a housing block of a hydraulic unit 10.

OBJECT OF THE INVENTION

The object of the invention is to propose a hydraulic unit which with regard to its outside dimensions is especially compact and whose housing block can be made more economically because of reduced mechanical machining effort and expense.

Because of its small dimensions, a hydraulic unit of the invention has a lower weight. Moreover, the proposed hydraulic unit makes highly dynamic brake pressure regulating operations possible, because the hydraulic line connections are especially short and have only few changes of course.

BRIEF DESCRIPTION OF THE DRAWINGS

The invention will be described in further detail below in conjunction with the drawings, in which:

FIGS. 2 and 3 are inverse views, that is, views which emphasize the recesses made on the housing block instead of the outlines of the housing block. Both views are on the same scale, so that the different size relationships of the resultant housing blocks are apparent.

DESCRIPTION OF THE PREFERRED EMBODIMENT

Figure 1:
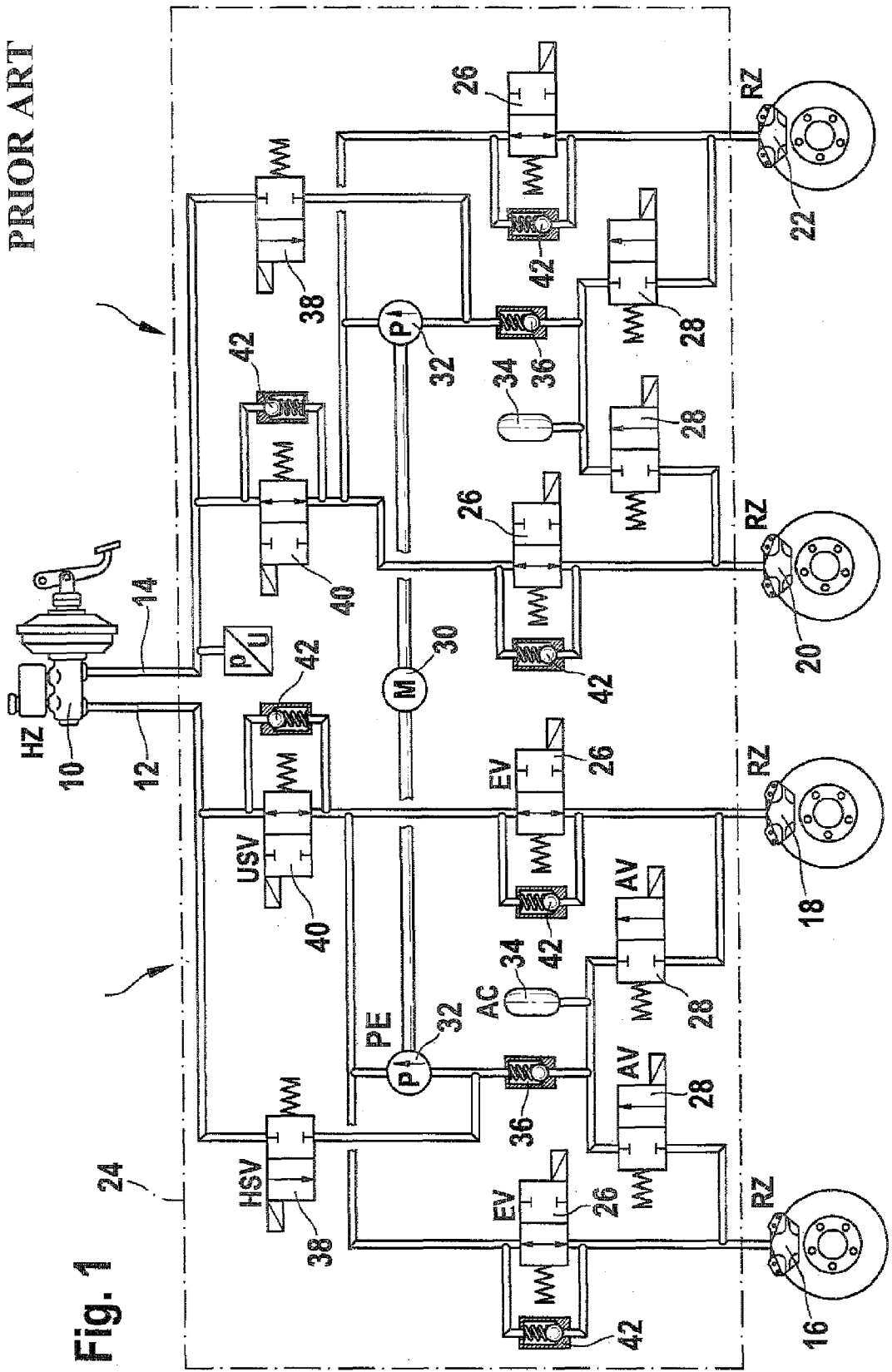
FIG. 1 shows the hydraulic circuit diagram, well known from the prior art, of a vehicle brake system with driving stability control.
Figure 2:
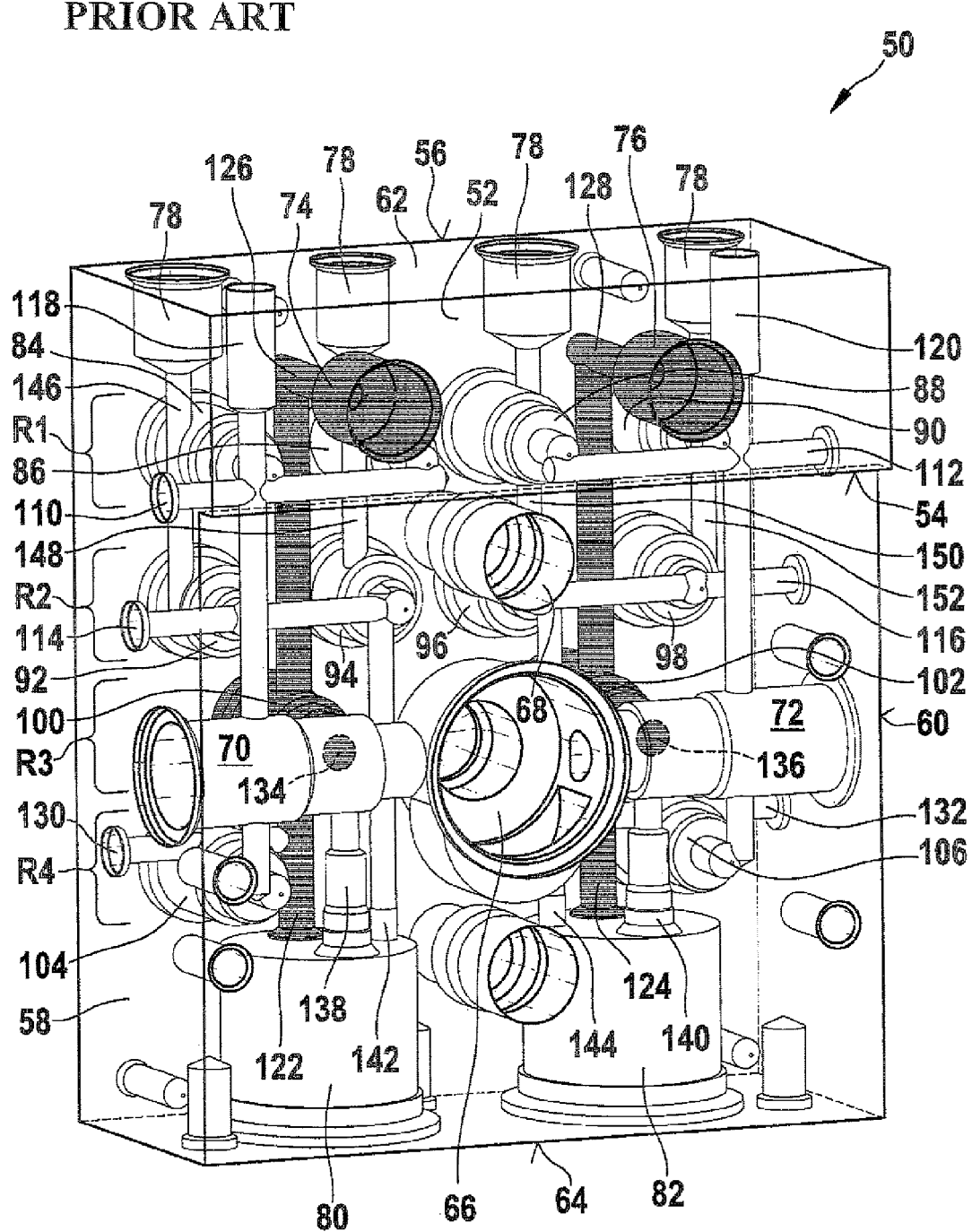
FIG. 2, in a perspective view, shows the disposition of the recesses necessary for embodying this hydraulic circuit diagram, in a housing block, also already known from the prior art, of a hydraulic unit.

FIG. 2 shows a housing block 50 of a hydraulic unit 10 (FIG. 1) known from the prior art. This housing block 50 is formed by a solid metal plate, which is provided with many recesses by means of metal-cutting postmachining. A front side 52 of the housing block 50 is graduated at a right angle a single time over its entire width. A resultant step 54 divides the housing block 50 into a thicker part, located toward the top in FIG. 2, and by comparison a recessed, thinner part, disposed in the lower part of the drawing. A back side 56, opposite the front side 52, and a left and right side 58, 60 and a top and a bottom side 62, 64 of the housing block 50 are formed by plane-parallel faces.

In the lower part of the housing block 50, there is a first recess 66, which is intended for receiving a drive element, not shown. This first recess 66 is stepped multiple times from the outside inward in its diameter and ends in blind borelike fashion in the interior of the housing block 50. For actuating the drive element, an electric motor, also not shown, can be secured from the outside to the lower part of the front side 52. A supply to this electric motor is effected via contact elements, which can be passed through a through bore 68 above the recess 66 for the drive element to the back side 56 of the housing block 50. This back side 56 serves the purpose of securing an electronic control unit (not shown), to which the contact elements can be connected, so that the electric motor is triggerable as needed.

Two pump elements are driven to a reciprocating stroke motion by the drive element. These pump elements are disposed on the housing block 50 in pump receptacles 70, 72. These pump receptacles are formed by stepped bores, which begin at the two sides 58, 60 of the housing block 50 and discharge into the recess 66 for the drive element. These pump bores 70, 72 extend horizontally and coaxially to one another.

Two recesses discharge in the upper part of the housing block 50, toward the front side 52. They form the hydraulic connections 74, 76 of the hydraulic unit for the two brake circuits of an external master cylinder (FIG. 1), for independent action on two brake circuits. Further hydraulic connections 78 are located on the top side 62 of the housing block 50. These connections 78 are provided for hydraulic contacting of the wheel brakes (FIG. 1; 16-22) of a vehicle.

Opposite the connections 78 of the wheel brakes, there are two recesses 80, 82 for low-pressure reservoirs on the bottom side 64 of the housing block 50. Each of the low-pressure reservoirs is assigned to one of the brake circuits (FIG. 1; 12, 14). Typically, known spring-loaded piston reservoirs are used as the low-pressure reservoirs.

Many identical valve receptacles 84-106 begin at the back side 56 of the housing block 50 and all end in blind borelike fashion in the interior of the housing block 50. These valve receptacles 84-106 are intended for receiving the valve part of various kinds of solenoid valves (not shown). Coils of these solenoid valves are received in the electronic control unit and surround the portions of the valve parts that protrude past the back side 56 of the housing block 50, once the control unit is mounted on that back side 56.

The valve receptacles 84-106 are disposed in rows. There are in all four horizontally extending rows R1-R4 of valve receptacles, and the rows are oriented parallel to one another and extend at different levels of the housing block 50.

The first row R1 oriented toward the top side 62 of the housing block 50 includes four valve receptacles 84-90, which are intended for receiving the inlet valves. Located below this first row R1 are the four valve receptacles 92-98 for the outlet valves, in a second row R2. The inlet and outlet valves are each associated in pairs with one of the wheel brakes. They serve, in the known manner, the purpose of pressure regulation.

A third row R3 of valve receptacles is partly concealed in FIG. 2 by the pump receptacles 70, 72. This row includes only two valve receptacles 100, 102, which are intended for the disposition of the high-pressure on-off valves of the vehicle brake system. Each brake circuit is equipped with one such high-pressure on-off valve. The high-pressure on-off valves control a hydraulic connection from the master cylinder (FIG. 1; 10) to the intake side of the pump elements in the pump receptacles 70, 72. A fourth row R4, oriented toward the bottom side 64 of the housing block 50, likewise includes two valve receptacles 104, 106, specifically for the so-called reversing valves of the vehicle brake system. Each of these is again present only once per brake circuit. These two valve receptacles are located closer to the sides 58, 60 of the housing block 50 than the valve receptacles 100, 102 of the high-pressure on-off valves of the third row R3, which are located closer to the center of the housing block 50. The reversing valves as needed block an existing pressure fluid connection from the wheel brakes to the master cylinder.

The above-described elements 70-106, with the exception of the recess 66 and through bore 68 for the drive element and for the contact elements of the electric motor, communicate hydraulically with one another through conduits that carry pressure fluid. For technical production reasons, these pressure fluid conduits are each oriented perpendicular to one of the outsides of the housing block 50 and thus may optionally meet at a right angle to one another in the interior of the housing block 50.

Two inlet valve conduits 110, 112, each beginning at a respective side 58, 60 of the housing block 50, connect two side-by-side valve receptacles 84, 86; 88, 90, respectively, for the inlet valves. The two inlet valve conduits 110, 112 are embodied as blind bores. They extend coaxially to one another in the horizontal direction and after their production are closed from the outside in pressure-fluid-tight fashion. As a rule, balls in the region of the orifice are press-fitted in for this purpose.

Two outlet valve conduits 114, 116, which likewise begin at the respective sides 58, 60 of the housing block 50 and are embodied as horizontally extending blind bores, extend parallel and offset toward the back side 56 of the housing block 50 to the inlet valve conduits 110, 112 and each connect two of the valve receptacles 92, 94; 96, 98 of the outlet valves with one another. These outlet valve conduits 114, 116 are likewise closed from the outside after their production.

Two vertical conduits 118, 120 begin near the sides 58, 60 from the top side 62 of the housing block 50. They each intersect one of the inlet valve conduits 110, 112 and each penetrate one of the pump receptacles 70, 72 and end each in one of the valve receptacles 104, 106 of the reversing valves. These vertical conduits 118, 120 are likewise closed from outside in a subsequent operation.

A first vertically extended connection conduit 122, 124 extends from the bottom of each recess 80, 82 for a low-pressure reservoir. This connection conduit penetrates the valve receptacle 100, 102 of the high-pressure on-off valves and ends in one of the cross conduits 126, 128, which begin at the connections 74, 76 for a brake circuit of the master cylinder. Each connection conduit 122, 124 is put into contact with one of the valve receptacles 104, 106 of the reversing valves by a horizontal bore 130, 132 that is to be closed.

Moreover, there are hydraulic connections 134, 136 from the valve receptacles 100, 102 of the high-pressure on-off valves to the pump receptacles 70, 72. These hydraulic connections are shown in dashed lines in FIG. 1, since they are hidden by the pump receptacles 70, 72.

One second connection conduit each 138, 140, beginning at the bottom of a respective one of the recesses 80, 82 for a low-pressure reservoir, established a direct pressure fluid connection between the recesses 80, 82 and one of the pump receptacles 70, 72. Further connection conduits 142, 144 connect the recesses 80, 82 of a low-pressure reservoir directly with one of the two valve receptacles 94; 96 of the outlet valves.

Finally, each two valve receptacles 84-90; 92-98, located one above the other, for an inlet valve and for an outlet valve are put into hydraulic contact with a respective connection 78 of a wheel brake. This purpose is served by coupling conduits 146-152, which begin at the bottom of the connections 78 of the wheel brakes and end in one of the valve receptacles 92-98 of the outlet valves. In all, four such coupling conduits 146-152 are embodied on the housing block 50.

In a vehicle brake system in accordance with the hydraulic circuit diagram of FIG. 1, each brake circuit can be divided into a so-called intake region and a system region. The intake region includes all the hydraulic components and pressure fluid connections that are to be associated with the intake side of an associated pump, while the system region includes all the components and pressure fluid connections that are disposed on the compression side of the associated pump. In FIG. 2, the recesses included in the intake region of a brake circuit are emphasized by a greater thickness of the lines representing them. The intake region of a brake circuit includes the respective connections 74, 76 of the master cylinder, the valve receptacle 100, 102 of the high-pressure on-off valve, and the pressure fluid conduits 122, 126 and connection 134.

In the prior art described, this intake region leads from a connection 74, 76 of the master cylinder directly to a valve receptacle 100, 102 of a high-pressure on-off valve and from there directly onward to a pump receptacle 70, 72 and to one of the recesses 80, 82 of a low-pressure reservoir. The valve receptacles 104, 106 of the reversing valves are located on the far side of that intake region. They are each connected, by means of horizontal bores 130, 132 to be produced separately, to the intake region and are moreover supplied with pressure fluid.

Because of this arrangement, however, the establishment of a flow is prevented when the reversing valve is closed and the high-pressure on-off valve is open, in the region around the valve receptacles 104, 106 of the reversing valves.

Figure 3:
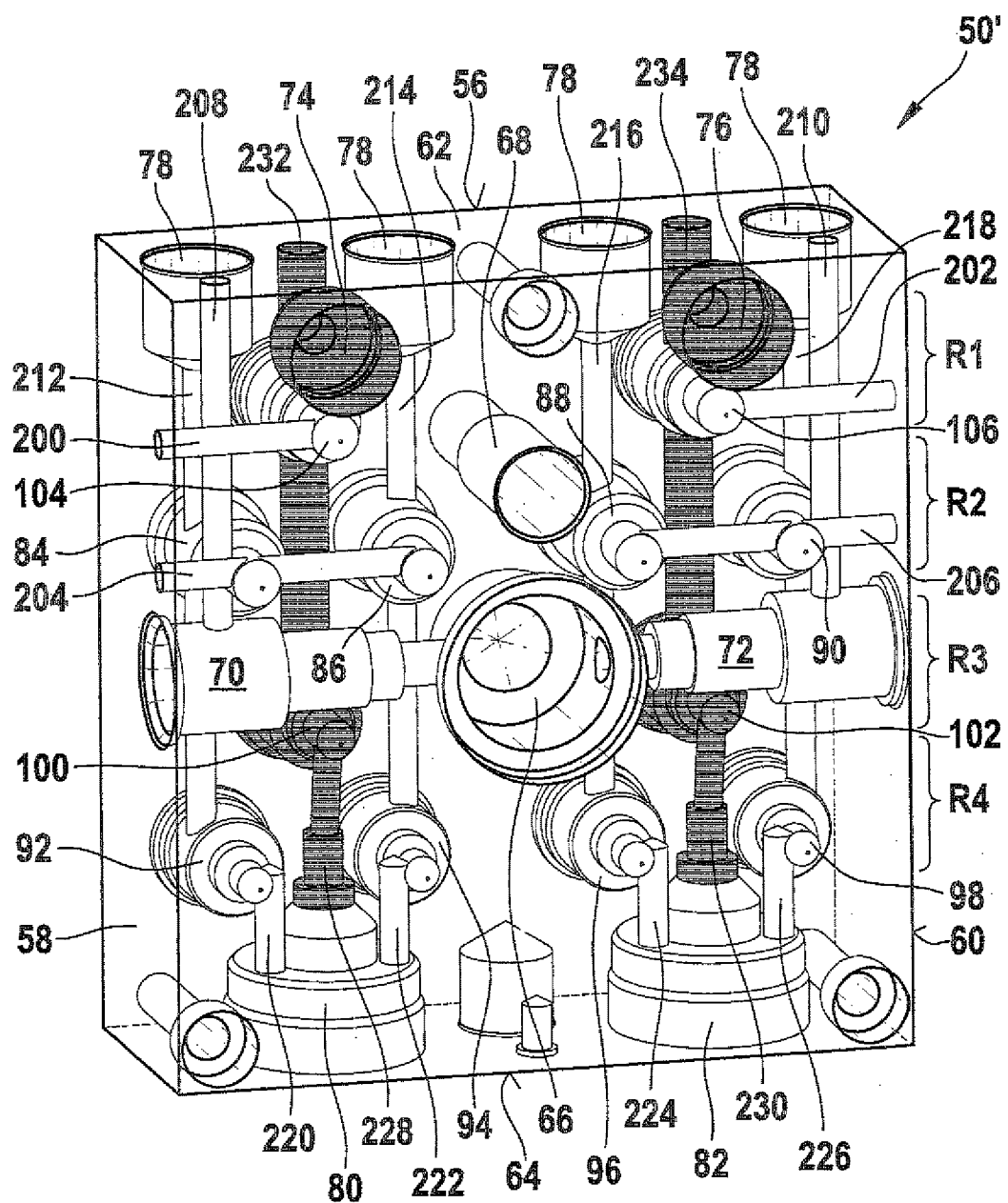
FIG. 3 by comparison to FIG. 2 shows a housing block with a disposition according to the invention of the requisite recesses.

FIG. 3 by comparison shows an advantageous disposition according to the invention of the recesses on a housing block 50'. This housing block 50' can now be embodied in parallelepiped fashion with pairs of plane-parallel, ungraduated outer sides. Its outside dimensions are markedly smaller than those of the housing block 50 shown in FIG. 2. Consequently, the proposed housing block 50' has a lesser weight. Moreover, its production requires markedly less time, since the production of the recesses necessitates fewer metal-cutting machining operations. In the ensuing description, the same reference numerals have been used for those recesses that correspond functionally to those of the housing block 50 of FIG. 2.

The recess 66 for the drive element, the pump receptacles 70, 72, the connections 74, 76 for the master cylinder, and the connections 78 for the wheel brakes, as well as the recesses 80, 82 for the low-pressure reservoirs are located in the same relative positions as in the prior art of FIG. 2, so that repetition in this respect is unnecessary. The essential distinction of this housing block 50' over that of FIG. 2 is in the disposition and hydraulic contacting of the valve receptacles 84-106 on the back side 56.

These valve receptacles 84-106 are again disposed in four parallel rows R1-R4, extending horizontally at different levels on the housing block 50'. However, the first row R1, oriented toward the top side 62 of the housing block 50', now includes only the two valve receptacles 104, 106 of the reversing valves of a dual-circuit vehicle brake system.

Below it is a second row R2 with a total of four valve receptacles 84-90. These are staggered relative to the valve receptacles 104, 106 of the first row R1. These valve receptacles 84-90 receive the inlet valves of the vehicle brake system.

A third row R3, again comprising only two valve receptacles 100, 102, is disposed slightly below the pump receptacles 70, 72 of this housing block 50'. These valve receptacles 100, 102 are intended for receiving the high-pressure on-off valves. With their inner end, they intersect the pump receptacles 70, 72 and as a result establish a pressure fluid connection, controllable by the high-pressure on-off valves, with the pump elements disposed in the pump receptacles. The valve receptacles 100 and 102 are staggered relative to the valve receptacles 84-90 of the second row R2 and are located perpendicularly below the valve receptacles 104, 106 of the first row R1.

The fourth row R4, again comprising four valve receptacles 92-98, which receive the outlet valves of the vehicle brake system, are located oriented toward the bottom side 64 of the housing block 50'. The valve receptacles 92-98 of the fourth row R4 and those of the second row R2 are located vertically one below the other.

The line connections for the hydraulic coupling of the receptacles, for the hydraulic components are made in this exemplary embodiment as well by means of bores extending perpendicular to one of the outer sides of the housing block 50', so that they may optionally intersect at a right angle in the interior of the housing block 50'.

Two horizontally extending cross conduits 200, 202 that are coaxial with one another begin at the two sides 58, 60 of the housing block 50' and end in the two valve receptacles 104, 106 of the reversing valves. Spaced apart below are two parallel-extending inlet valve bores 204, 206. These again begin at the two sides 58, 60 of the housing block 50' and each connect the respective two valve receptacles 84, 86; 88, 90 of the inlet valves of one brake circuit with one another. The inlet valve bores 204, 206 are embodied as blind bores and end in the respective inner valve receptacle 86; 88. Both the two cross conduits 200, 202 and the two inlet valve bores 204, 206 are closed from the outside after their production.

For the production of a hydraulic connection of the cross conduits 200, 202 with the inlet valve bores 204, 206, vertical conduits 208, 210 are provided. They are located close to the sides 58, 60 of the housing block 50' and begin at the top side 62 of the housing block 50'. They discharge into a respective one of the pump receptacles 70, 72. On their way there, the vertical conduits 208, 210 intersect both one of the cross conduits 200, 202 and one of the inlet valve conduits 204, 206. The vertical conduits 208, 210 are likewise closed from the outside after their production.

A total of four blind bores 212-218 extend again in the vertical direction, but relative to the above-described vertical conduits 208, 210 they extend in a plane that is offset toward the back side 56 of the housing block 50'. These blind bores each begin at the bottom of the connections 78 of the wheel brakes; they then penetrate the valve receptacles 84-90 of the inlet valves, and end in the valve receptacles 92-98 of the outlet valves.

The valve receptacles 92-98 of the outlet valves of the wheel brakes are coupled, via short, vertically extending cross conduits 220-226, with one of the recesses 80, 82 for a low-pressure reservoir on the bottom side 64 of the housing block 50r. Besides the cross conduits 220-226, a respective third vertical connecting conduit 228, 230 extends from the bottom of the recess 80, 82 of a low-pressure reservoir along a straight and vertical course to the valve receptacle 100, 102 of one of the high-pressure on-off valves.

Two vertical bores 232, 234, made from the top side 62 into the housing block 50' and closed from the outside after their production, intersect one of the connections 74, 76 of the master cylinder, and each penetrate one of the valve receptacles 104, 106 of the reversing valves and end in the one of the valve receptacles 100, 102 of the high-pressure on-off valves. Moreover, each of the vertical bores 232, 234 effects a connection with the respective pump receptacles 70, 72.

If in this exemplary embodiment the intake regions of the two pumps are looked at (characterized by a widened line thickness of the applicable recesses), it can be seen that the pressure fluid connections from one of the connections 74, 76 of the master cylinder to one of the valve receptacles 100, 102 of the high-pressure on-off valves extend through one of the valve receptacles 104, 106 of the reversing valves. The effect of this is such that with the reversing valve closed and the high-pressure on-off valve open, flows of brake fluid that occur also cause flows in the regions of the valve receptacles 104, 106 of the reversing valves. This fundamental distinction from the subject of FIG. 2 makes a housing block 50' possible that has more-compact outer dimensions, a lower weight, and simpler metal-cutting machining.

The foregoing relates to the preferred exemplary embodiment of the invention, it being understood that other variants and embodiments thereof are possible within the spirit and scope of the invention, the latter being defined by the appended claims.

The invention claimed is:

1. A hydraulic unit for regulating the brake pressure in a vehicle brake system, comprising:
   a housing block;
   valve receptacles defined by the housing block for receiving electronically triggerable solenoid valves;
   pump receptacles defined by the housing block, the pump receptacle being oriented transversely with respect to the valve receptacles;
   pump elements disposed in the pump receptacles and configured to be actuated by a drive;
   hydraulic connections defined by the housing block, the hydraulic connections including a first master cylinder connection for connecting the housing block to a master cylinder and at least one wheel brake connection for connecting the housing block to at least one wheel brake;
   pressure fluid connections for carrying brake fluid in the housing block, which put the valve receptacles, the pump receptacles, and the hydraulic connections in hydraulic communication with one another;
   a first solenoid valve (reversing valve) disposed in a first valve receptacle, the first valve receptacle being fluidly connected to the first master cylinder connection, the first solenoid valve being configured to block a flow of brake fluid from the at least one wheel brake connection to the first master cylinder connection;
   a second solenoid valve (high-pressure on-off valve) disposed in a second valve receptacle, the second valve receptacle being fluidly connected to a first pump receptacle, the second solenoid valve being configured to control a flow of brake fluid into an intake side of the pump element in the first pump receptacle; and
   a bore defined in the housing block that fluidly connects the first valve receptacle to the second valve receptacle,
   wherein the valve receptacles include a row of inlet valve receptacles and a row of outlet valve receptacles,
   wherein the row of inlet valve receptacles and the first valve receptacle are positioned between the pump receptacles and the top side portion of the housing block, and
   wherein the row of outlet valve receptacles and the second valve receptacle are positioned between the pump receptacles and the bottom side portion of the housing block.

2. The hydraulic unit as defined by claim 1, further comprising a pressure fluid connection of the valve receptacles of the inlet valves of a brake circuit with the valve receptacle of an associated reversing valve and with a pump receptacle, which pressure fluid connection is formed of a plurality of individual bores that are closed from an outside of the housing block and end in blind bore like fashion in an interior of the housing block.

3. The hydraulic unit as defined by claim 2, wherein the pressure fluid connection is formed by a total of three individual bores, and two of the three individual bores extend parallel to one another and communicate with one another through a third individual bore, extending transversely to the other two and discharging into one of the pump receptacles.

4. The hydraulic unit as defined by claim 2, wherein the valve receptacles on the housing block are disposed in a plurality of rows, parallel to one another and disposed at different levels, and wherein the valve receptacles of the solenoid valves (reversing valves) by which a pressure fluid connection from the connection of a wheel brake to one of the connections of the master cylinder can be blocked are disposed in a first row, oriented toward the hydraulic connections of the housing block.

5. The hydraulic unit as defined by claim 3, wherein the valve receptacles of the solenoid valves (outlet valves) which control a pressure fluid connection from one of the connections of a wheel brake to one of the pump receptacles are oriented toward an end of the housing block that is opposite an end of the housing block that has the hydraulic connections.

6. The hydraulic unit as defined by claim 1, wherein the housing block is embodied in parallelepiped fashion with continuously flat plane-parallel pairs of outer faces.

7. The hydraulic unit as defined by claim 2, wherein the housing block is embodied in parallelepiped fashion with continuously flat plane-parallel pairs of outer faces.

8. The hydraulic unit as defined by claim 3, wherein the housing block is embodied in parallelepiped fashion with continuously flat plane-parallel pairs of outer faces.

9. The hydraulic unit as defined by claim 4, wherein the housing block is embodied in parallelepiped fashion with continuously flat plane-parallel pairs of outer faces.

10. The hydraulic unit as defined by claim 5, wherein the housing block is embodied in parallelepiped fashion with continuously flat plane-parallel pairs of outer faces.

11. The hydraulic unit as defined by claim 1, wherein the first valve receptacle is positioned between the row of inlet valve receptacles and the top side portion of the housing block.

12. The hydraulic unit as defined by claim 1, wherein the second valve receptacle is fluidly connected to a bottom portion of the first pump receptacle.

* * * * *